United States Patent [19]
Bloomfield

[11] Patent Number: 4,758,892
[45] Date of Patent: Jul. 19, 1988

[54] SYSTEM FOR PRODUCING A VIDEO COMBINE FROM MULTIPLE VIDEO IMAGES

[75] Inventor: John F. Bloomfield, San Francisco, Calif.

[73] Assignee: Ampex Corporation, Redwood City, Calif.

[21] Appl. No.: 604,790

[22] Filed: Apr. 27, 1984

[51] Int. Cl.$^4$ ............................................. H04N 5/262
[52] U.S. Cl. ..................................... 358/183; 358/22; 358/182
[58] Field of Search ................... 358/182, 183, 22, 185

[56] References Cited

U.S. PATENT DOCUMENTS

| | | | |
|---|---|---|---|
| 3,598,908 | 8/1971 | Poulett | 358/182 |
| 3,673,324 | 6/1972 | Ito | 358/182 |
| 3,728,479 | 4/1973 | Srinivasan | 358/183 |
| 4,028,727 | 6/1977 | Skrydstrup | 358/182 |
| 4,207,596 | 6/1980 | Pires | 358/182 |
| 4,360,831 | 11/1982 | Kellar | 358/183 |
| 4,602,286 | 7/1986 | Kellar | 358/183 |

Primary Examiner—Tommy P. Chin
Attorney, Agent, or Firm—George B. Almeida; Richard Lange

[57] ABSTRACT

Video channel combines are produced by digitally processing binary numbers representing values of video image information in multiple channels, for corresponding points in a display of the resulting composite video image. The binary numbers are combined in the course of processing in response to processed key signals which determine a preselected percentage of each binary number's value, to produce new binary numbers. After summation, the latter represent composite video image values to be displayed at the same temporal and spatial locations of the display of the composite video image. Total percentages resulting from the summation of all numbers for each composite video image value, including numbers corresponding to percentage of background video, is equal to 100%.

42 Claims, 6 Drawing Sheets

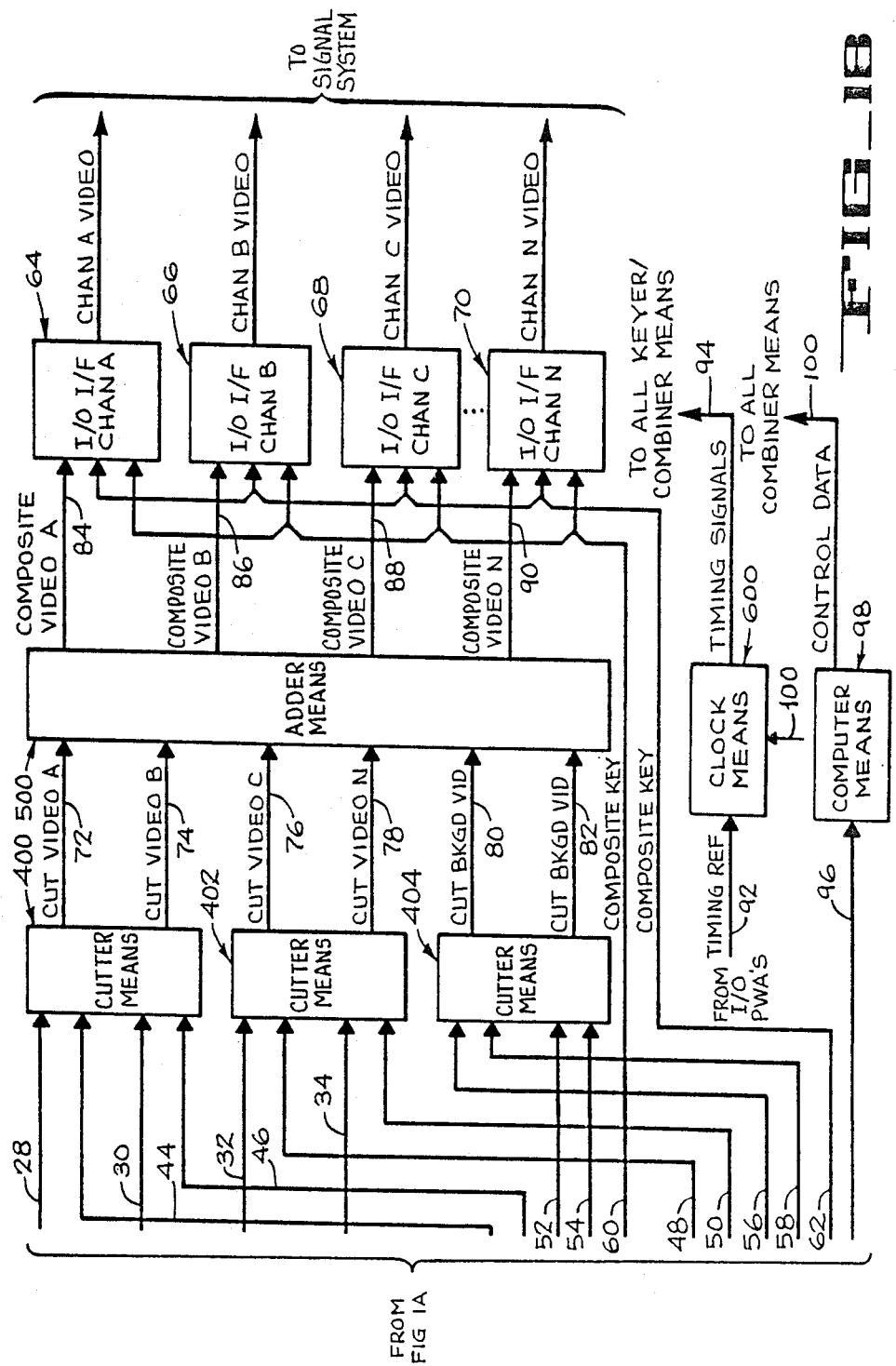

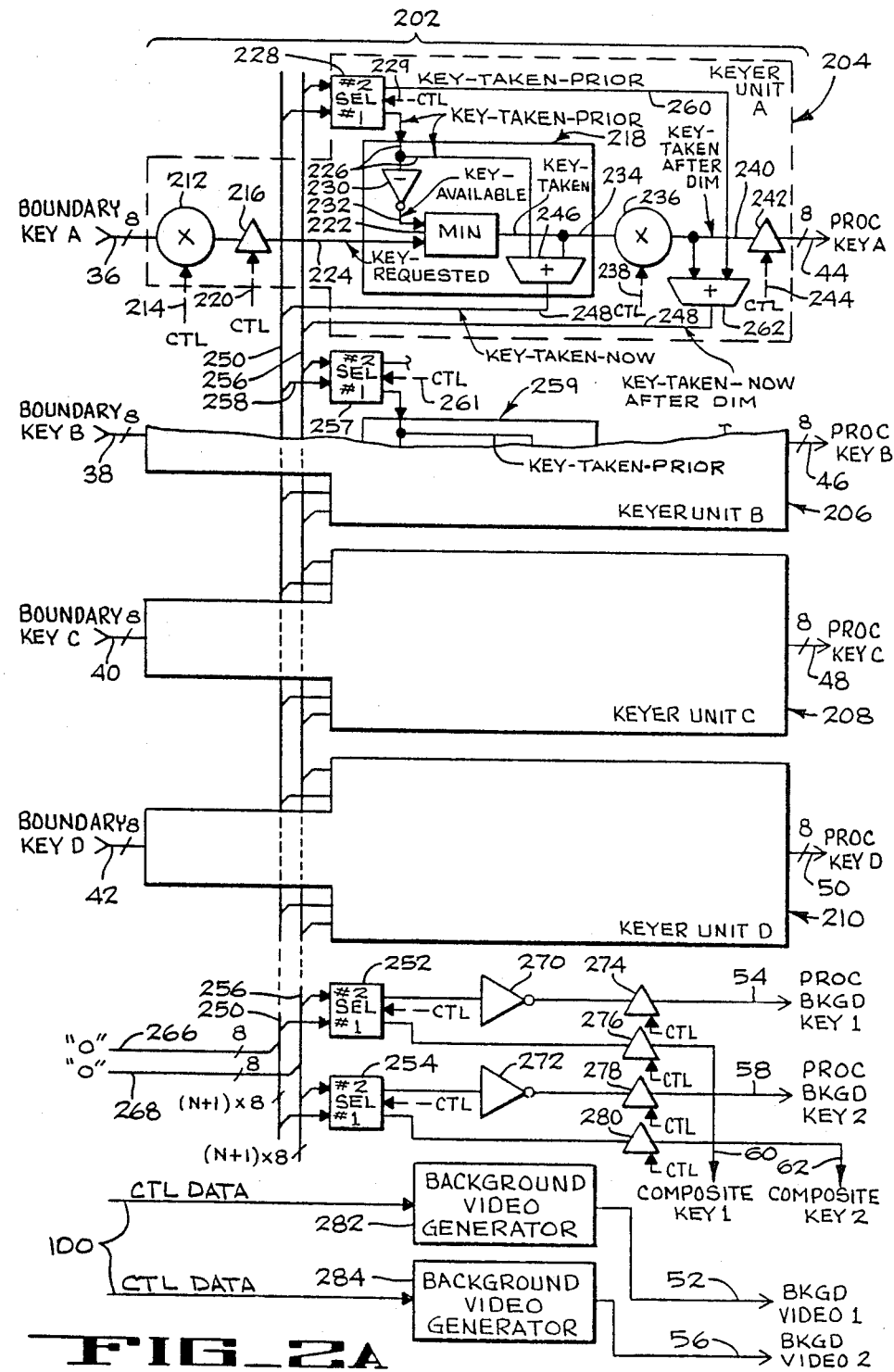
FIG_2A

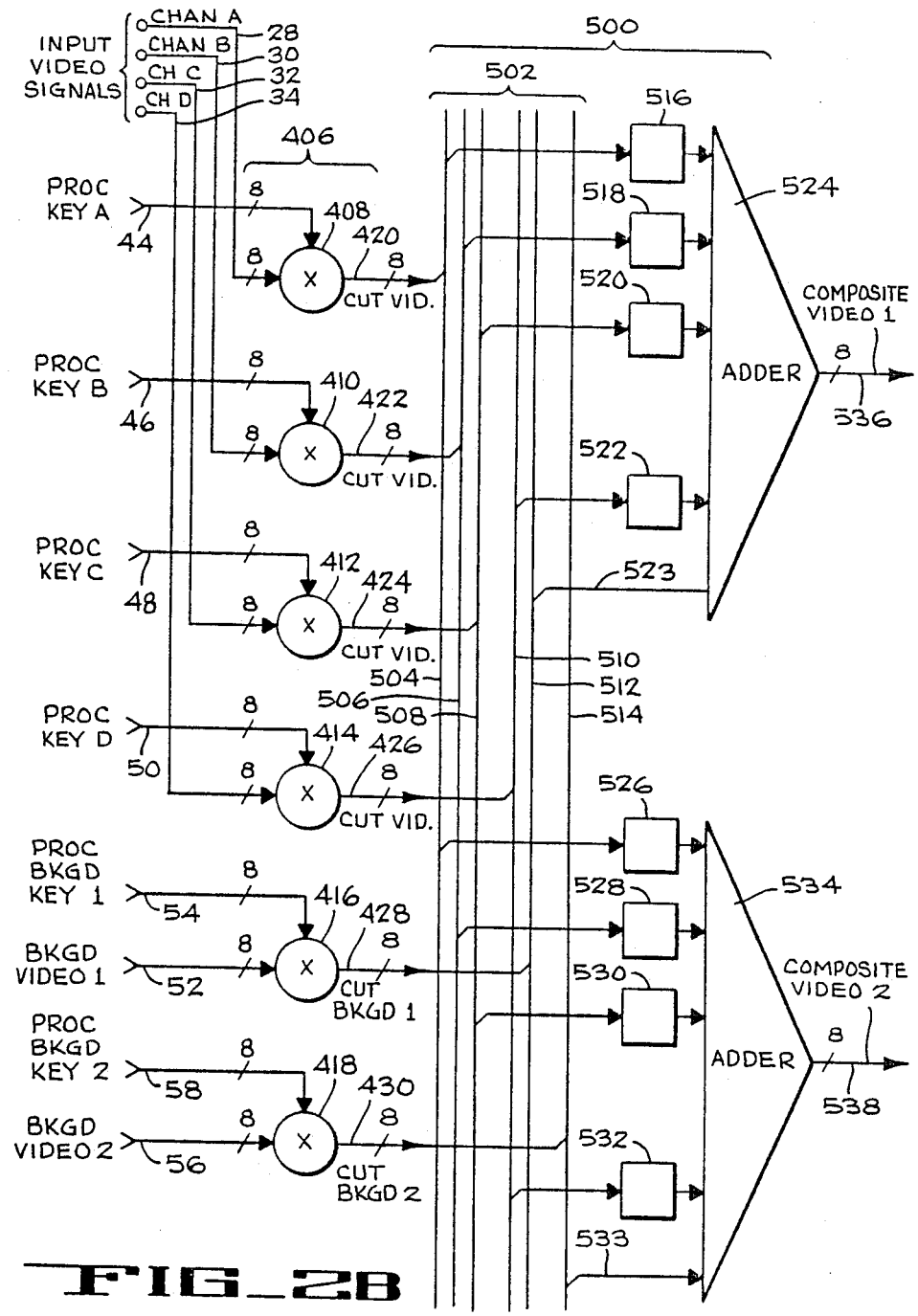
FIG_2B

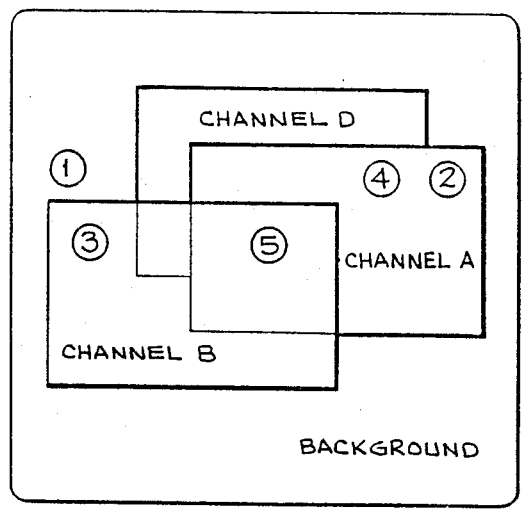
FIG_3
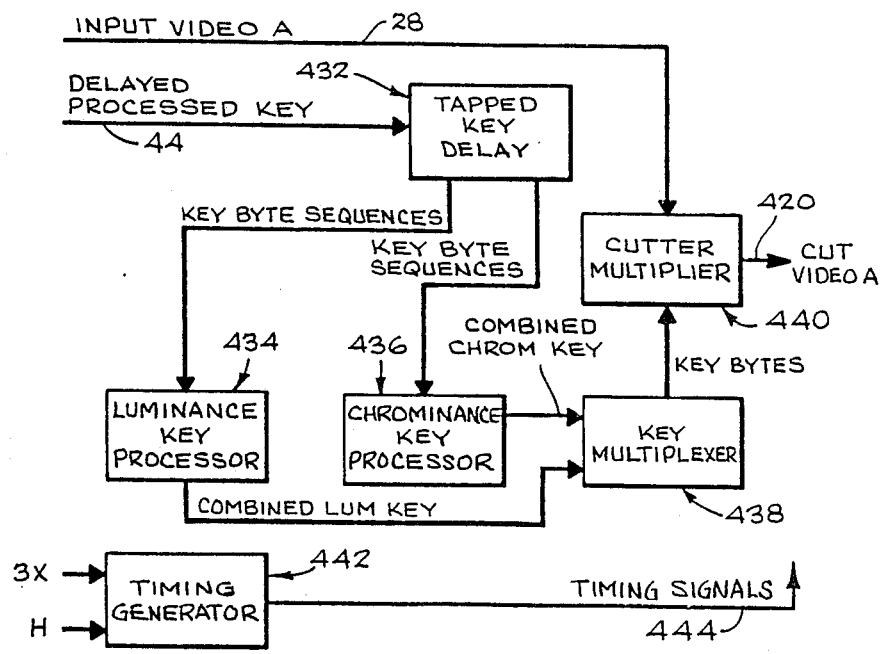
FIG_4

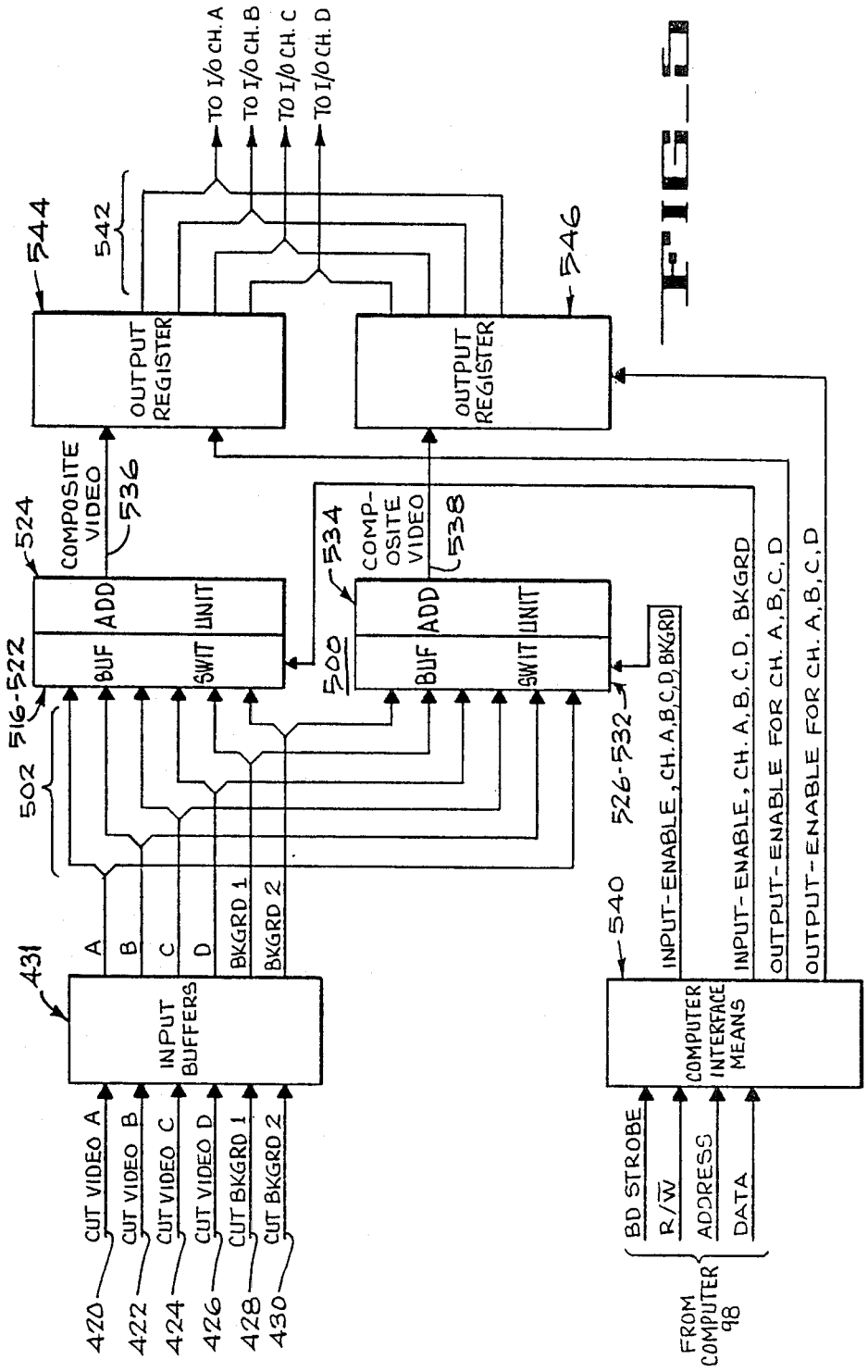

SYSTEM FOR PRODUCING A VIDEO COMBINE FROM MULTIPLE VIDEO IMAGES

BACKGROUND AND SUMMARY OF THE INVENTION

The invention relates to the generation of special video effects and particularly to systems for combining selected percentages of multiple video images into a composite image, as determined by respective key signals.

Various apparatus and techniques exist at present for selectively handling, combining and/or otherwise manipulating one or more video images in television systems. Typical of such apparatus are analog and/or digital schemes for providing a dissolve video output signal wherein, for example, an attenuator network controlled by a counter incrementally changes the signal level of one video input in one direction from a first of opposite level limits while incrementally changing the signal level of a second video input in a corresponding manner, but in the opposite direction from the other of the opposite level limits. Such a scheme provides a uniformly conducted dissolve operation, wherein first video information is replaced by second video information, while a summation of the varying percentage of each of the two video signals ideally always is equal to 100% over the entire dissolve interval. The attenuation signal in such a scheme is operated at a clock rate corresponding to the video field rate, that is, at a rate of one times or a sub-multiple of the vertical sync rate. Such a digitally controlled lap dissolver network is illustrated, by way of example, in U.S. Pat. No. 3,598,908, assigned to the same assignee as is this application.

Production switchers also commonly are used to perform switching and various picture manipulations of video signals in the analog domain. Video signals such as generated by cameras in real time, or by recorders in non-real time, are variously combined, moved and/or otherwise selectively manipulated in such switcher apparatus. Generally in combining video signals, the switcher employs control signals commonly termed chroma key signals which, for example, are used to cut a hole in a background video signal, which hole then is filled with a foreground video signal to provide a composite video image of the two signals. Thus the combined image is formed of portions of either one or the other video signal; that is, switchers generally are capable of handling only foreground and background signals.

As may be seen, the video lap dissolver type of apparatus briefly discussed above, provides simple ramp switching of two video signals, wherein the video signals themselves are gradually switched to replace one with the other. Likewise, the production switchers of previous mention perform a switching operation on the video signals themselves, or on the video paths thereof, in the course of performing a soft or hard switch between the various incoming signals. The above switching techniques in general perform the switching operation in the analog domain and/or perform hard digital switching wherein inputs are either off or on. Thus, in general, prior techniques of combining video signals or images suffer from the problem that stepping motions are visible in the picture during movement of the images, and further that aliasing components become apparent in regions of hard edge transitions. Additionally, such schemes generally do not afford the requisite degree of control repeatability and accuracy presently required in the field of digital special effects.

The increased use of digital special effects in television has created an increasing demand for more sophisticated picture manipulation capability, and improved picture quality, while further requiring added flexibility in human interface with the apparatus than presently is provided by systems such as the dissolve apparatus and/or the production switchers of previous mention. It follows that it is essential that new product designs be developed which provide flexible, easily managed control and signal channel combinations that allow an operator to quickly and simply adapt a system to changing operational needs on a modular basis. Further, in view of the trend towards the all-digital environment of future television systems, any new digital special effects system must be capable of all-digital operation and thus must perform all picture processing operations in the digital domain.

Recently, digital optics special effects systems have been introduced in the television field which modify and manipulate the geometry of video pictures at real time video rates, while operating entirely within the digital domain. One such system allows picture geometry changes on any spatial axis of an inherently two-dimensional video picture, including true three-dimensional perspective, at real time video rates. This latter system is manufactured by Ampex Corporation, Redwood City, Calif., under the name ADO digital special effects system, and is described in the Ampex Digital Optics Service Manual No. 1809550, issued November, 1983. More conventional effects such as picture size and position changes also are produced by the system, but with absolute visual smoothness of picture movements and high picture quality throughout all motion and manipulation of the video pictures. Thus, high quality picture manipulation is performed smoothly at any speed without stepping motions by the picture during movement.

The present invention combination, hereinafter termed a "combiner" for convenience, adds yet a further level of sophistication to existing special effects systems. To this end, the present combiner contemplates an additional manipulation of multiple video images utilizing a video effect or technique known as video channel combine. A "combine" is effected by combining two or more channels of video signals in such a way as to make scenes or images corresponding to the various signals, appear to be one behind the other as in accordance with a selected "priority". For example, a combine may display a first video image from one channel of highest priority in front, followed by a second video image from a second channel, which in turn is in front of and followed by a third video image from a third channel, etc. The combine may appear over a selected background such as black or gray, wherein the background has the lowest priority and fills all display areas where the proportions of the composite video image do not add up to 100%.

Further, the video images of the various channels in a combine may exhibit various degrees of transparency. This allows images with lower priorities, that is, images which would be hidden behind another image, to partially show through; i.e., to be partially visible due to the transparency of the image or images in front. In a further effect, the images of any channel also can be dimmed if desired, to the black, gray or other desired background. The dimming effect is enhanced by a light source feature which highlights selected images or planes while dimming others. The determination of the transparency and dimness of the channels, like the changes in priority of the channels, can be programmed to occur automatically, and are made on a video field-by-field basis.

Thus, the present combiner overcomes various shortcomings in the art discussed above, while providing various combine effects heretofore unavailable in the art. Because timing differences between video channels are completely eliminated, combines produced by the present combiner synchronize together perfectly. Multiple images of more than just a background video signal and a foreground video signal are smoothly combined with a high degree of control repeatability and accuracy. In addition to providing extensive ranges of transparency and intensity, soft edge keying with a minimum of aliasing is accommodated if a soft key is introduced by the signal system. The processes of designating priority, transparency and dimness are more readily achieved by the present combiner, since the system processes the controlling key signals, rather than processing the video images themselves as heretofore commonly done in the art.

As a further advantage, a combiner employing at least four channels can produce two independent combines simultaneously, with each combine being the result of combining two video images from two channels. Any one of the four channels may be selected for combination with any other channel to provide a combine. Each combine process is controlled by one of two different user control panels, while each combine utilizes different pairs of video images of the four video channels.

More particularly, video channel combines are produced by digitally processing binary numbers representing values of video image information in a channel for picture elements of a display. Channels to be combined are first synchronized so that binary numbers representing image values in different channels, arrive at processing logic in the combiner during the same cycle of processing clocks. The binary numbers are combined to produce new binary numbers which represent a combined or composite video image value to be displayed at the same temporal and spatial location of the display of the composite video image. Numbers are combined in the course of processing, by taking a preselected percentage of each number's value and adding the products thereof. Total percentages resulting from the summation of all numbers for each composite video image value, including the number corresponding to the percentage of background desired, is equal to 100%.

By way of illustrating the present combiner configuration, two or more channels of digital video are supplied directly to cutter means by two or more signal systems. The cutter means perform the process of reducing (i.e., "cutting") the binary numbers of previous mention, to some percentage of their original value. Each respective channel also supplies associated boundary key data to respective keyer means which, in turn, supply respective processed key signals indicative of the percentage that the binary numbers of each channel are to be cut. The processed key signals are coupled to the respective cutter means of previous mention. The multiple channels of cut video signals are fed from the cutter means to adder means. The adder means perform a summation, or summations, of the cut video signals and supply one or more outputs therefrom. The outputs correspond to the composite video images formed by one or more combines, processed in accordance with the invention combination. The composite video images are supplied back to the signal system for conversion to a conventional analog composite video signal. The signal system may comprise the ADO system of previous mention.

Accordingly, it may be seen that the present combiner provides for precisely combining a plurality of video images manipulated by the signal system with a selected background. Further, the combiner provides the channel combines without switching the major video paths, or the video signals themselves, as is commonly performed by the prior art signal combining schemes discussed above. In a system having at least four channels, the combiner provides the generation of at least two independent combines simultaneously, employing any combination of two of the four available channels under control of two separate control panels. Thus two independent users may perform independent combines simultaneously, wherein the combines need not be timed to the same reference. In a further feature, a process for automatically determining the priority of the channels, and thus the order of the video images in a combine, on a field-by-field basis, is employed to continuously determine in real time which channel or channels are in front of the other.

BRIEF DESCRIPTION OF THE DRAWINGS

FIGS. 1A,1B are a block diagram illustrating the invention combination in an overall signal systems environment;

FIGS. 2A,2B are a block diagram illustrating further the combination of FIG. 1;

FIG. 3 is a pictorial representation of a combine employing three channel video images on a video background;

FIG. 4 is a block diagram of a cutter section further illustrating the cutter means of FIGS. 1,2; and FIG. 5 is a block diagram of adder means of the FIGS. 1,2.

DESCRIPTION OF THE PREFERRED EMBODIMENTS

Figure 1A:
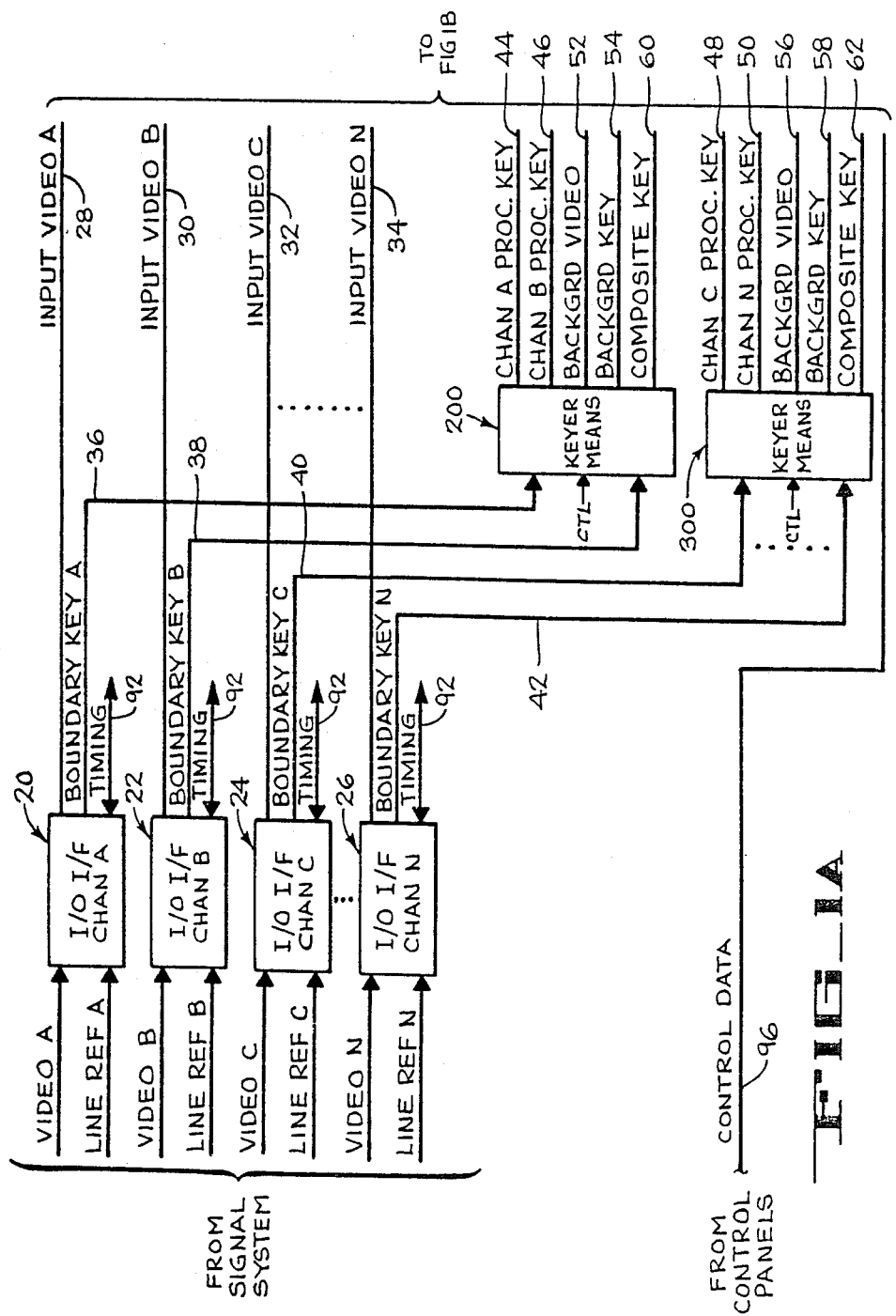

An embodiment of the present combiner is illustrated in FIGS. 1A,1B as a multiple channel apparatus formed of channels A, B, C and N, each carrying respective input video signals A, B, C and N supplied by an associated signal system such as the ADO system of previous mention. Although illustrated herein for description purposes as a four channel system, the invention contemplates the use of other odd or even multiple numbers of channels such as, for example, two through sixteen, etc., channels. Each video signal of the channels A-N also includes within the signal, respective boundary key data associated with each video image of the respective signals and supplied by the signal system. Boundary key is used herein in the usual context employed in the switcher art, as defining the presence or absence of video information in a channel; that is, it defines the boundary or border enclosing a video image displayed as a composite video image on background video.

Briefly, the boundary key data are selectively processed in the present combiner system to provide a like number of processed key signals, one and preferably two processed background key signals, and at least one and preferably two processed composite key signals.

Processed key signals differ from the boundary key signals in that they define the percentage that the video images of respective channels are to be reduced. The multiple processed key signals (K1,K2 ... Kn) and the processed background key signals (KB) have the property K1+K2 ... +Kn+KB=1.00, where each key signal is of a value within the range of 0.00 to 1.00. The processed key signals are defined as follows: K1=Kin1, Kin=Min(1−K1,K2), K3=Min(1−K1−K2,Kin3), K4=Min(1−K1−K2−K3,Kin4) . . . , Kcomp=K1+K2+K3+... Kn, and KB=1−Kcomp.

An alternative method of key processing to that expressed by the above equations, is to replace the minimum (Min) operator with a multiplication operator. This latter method produces more correct transparencies according to the laws of physics with, however, less desirable effects on picture edges.

The above equations are for the condition or "combine" where the first image is in front of the second image, which in turn are in front of the third image, etc. FIG. 3 illustrates a combine with scene B in front followed by scene A, which is followed by scene D, i.e., channel B is assigned the highest priority for furnishing video image information to the displayed composite video image, channel A is assigned the next highest priority and channel D the lowest priority. This combine of three video channels appears over gray background video, although any color of background video can be supplied. The channels in a combine can have various degrees of transparency. This feature allows scenes in a combine which are behind other scenes to partially show through, as depicted by the scenes in channels A and D showing through the scene in channel B. In another feature, channels also can be dimmed, an effect provided when a percentage of background video will be forced into the video in a channel.

As is explained further, the combiner system is implemented by identical processing modules for each key signal input and by the associated switching, wherein a cascade output of a higher priority module is fed to the cascade input of a next lower priority module.

The processed key signals and processed background key signals are utilized to modify the video image values in each of the channels in parallel, on an input video sample-by-video sample basis, in a digital implementation. In order to preserve the correct gains and levels in the composite video image, the processed video and background key signals must have the property of previous mention; that K1+K2 ... +Kn+KB=1.00. It may be seen that the priorities of the channels, and the method of combining the images, is controlled entirely by the key-related circuitry. Therefore, the combiner system of the invention does not require switching of the video signals themselves and, accordingly, lends itself to a relatively simple and efficient digital implementation.

Referring particularly to FIGS. 1A,1B, a plurality of channel input/output interfaces (I/O) interfaces 20, 22, 24, and 26 receive channel A, B, C, N video signals, respectively, which include associated boundary key data, and also receive respective channel A, B, C, N line reference signals, from a suitable signal system. The channel video and line reference signals may be supplied, for example, by the ADO signal system of previous mention, within which environment the present combiner is depicted for purposes of description only. Other video sources such as, for example, video cameras may be used to supply the video and line reference signals. The data from the signal system is organized in a known format of combined luminance, chrominance and boundary key samples, which format enables the luminance, chrominance and key samples to be distinguished for separation. The I/O interfaces receive the combined samples, identifies them and provides separation thereof, as further described below.

The I/O interfaces 20-26 provide respective channel A, B, C, N, input video signals on video busses 28, 30, 32, and 34 respectively, and also provide channel A, B, C, N, boundary key signals on busses 36, 38, 40, 42 respectively. It is understood that the notation "N" representing the fourth channel indicates in conventional fashion that further channels may be added to the combiner system. The boundary key signals on busses 36 and 38 are coupled to keyer means 200, and the boundary key signals on busses 40, 42 are coupled to keyer means 300. Each keyer means generate processed key data for each channel which reflect each priority of the channels involved in a common combine. The keyer means also generate processed background key signals and processed composite key signals, while further supplying background video signals for each of two possible combines. For ease of description "key signals" and "video signals" will hereinafter be referred to simply as "key" and "video" respectively.

The channel A,B input video on busses 28 and 30 are coupled to cutter means 400, while the channel C, N input video on busses 32 and 34 are coupled to cutter means 402. The cutter means perform the process of reducing the digital numbers representing respective values of input samples of video image information to be displayed at the same temporal and spatial location of the display of the composite video image, to some percentage of each sample's original value.

The channel A, B processed keys are supplied by the keyer means 200 to the cutter means 400 on respective busses 44, 46, while the channel C, N processed keys are supplied by the keyer means 300 to the cutter means 402 via respective busses 48, 50.

A background video and a processed background key generated by keyer means 200, are coupled via respective busses 52, 54 to cutter means 404, while a background video and a processed background key generated by the keyer means 300, are coupled to the cutter means 404 via the busses 56, 58 respectively. Composite keys generated by respective keyer means 200, 300 are supplied by busses 60, 62 to a plurality of I/O interfaces 64, 66, 68 and 70. The latter I/O interfaces are, in practice, the same I/O interfaces as those labeled 20-26 of previous mention and depicted at the left side of the FIG. 1A.

The cutter means 400 supply channels A, B of cut video to adder means 500 via respective busses 72, 74. The cutter means 402 similarly provide channels C,N of cut video to the adder means 500 via busses 76 and 78. Cutter means 404 provide two channels of cut background video on busses 80, 82 to the adder means 500. The adder means include circuits for performing two independent summations, that is, combine operations, simultaneously. Any combination of inputs can be fed to either adder means circuit, and either output can be fed to any of the four channel outputs. In FIG. 1B, the four composite video channels A, B, C, N are depicted as supplying the respective I/O interfaces 64, 66, 68, 70 respectively, via composite video busses 84, 86, 88 and 90.

Timing reference signals are depicted extending between the I/O interfaces 20-26 and clock means 600 via lines 92. The clock means provide timing signals derived from the timing reference signals to all combiner system boards; viz, the keyer means, the cutter means, and the adder means circuitry via lines 94, as further described below. Likewise, control data is supplied from control units, such as operator controlled panels (not shown) of the signal system, to combiner computer means 98, via lines 96. The computer means 98 provide control data via multiple lines 100 to the combiner system boards formed of the various keyer and adder means and further described below.

To facilitate the description thereof, the present combiner is described employing a digital component signal television system wherein the chrominance information is described by two components in the known R-Y, B-Y format. The luminance component is sampled at a rate of 13.5 megaHertz (MHz) to obtain samples of the luminance information in correspondence with the known 4:1:1 digital component color television standard. Each of the two chrominance components is sampled and the key data are provided at a rate of one-quarter and one-half, respectively, of the 13.5 MHz rate. It is to be understood that the present combiner system can readily be used with a composite signal television system wherein the composite video signal is sampled at the 13.5 MHz rate.

In the combiner system herein described by way of example only, the sampled luminance component is represented as an 8-bit binary number. The most significant bit is the sign bit, with 0 and 1 representing positive and negative signs, respectively. The highest value the bits can represent is 01111111, which is equivalent to +127 to the base 10. The lowest value is 10000000, which in twos complement form is equivalent to −128 to the base 10. Chrominance and key values also are represented as 8-bit binary numbers with the values ranging from −128 to +127 in the same manner as described for luminance values. Transparency of a channel also is represented by 8-bit binary numbers which are used to modify the boundary key data in an inverse function. That is, the higher the value of the key number, the less transparent is the channel. When the key number is a minimum value, −128, the channel is completely transparent. The highest number, +127, represents a complete opaque channel. It follows that a binary number having a value between the lowest and the highest number represents a corresponding partially transparent channel.

The ADO signal system providing the video information to be processed by the combiner furnishes the video component signals and the boundary key signals organized in a known format and bandwidth compatible with the combiner. More specifically, the ADO signal system associated with each channel of the combiner provides two byte serialized stream of data in binary notation, one containing luminance data samples and the other containing alternating chrominance and boundary key data samples. The chrominance and boundary key data stream is in a format that permits the boundary key data samples to be distinguished and separated from the chrominance data samples. Each pair of byte serialized streams of luminance, chrominance and boundary key data samples from a signal system is coupled to one of the channel I/O interfaces, 20-26, which effects the separation of the video component and boundary key data samples into the required channel format. For such separation, each I/O interface includes suitable formatting logic for effecting such identification and separation. The I/O interface of each channel formats the received serialized stream of data into two serialized streams, with the luminance and chrominance samples in one byte (8-bit binary number) in a serialized video information stream and the boundary key samples in a second byte serialized key information stream. In the video information stream, luminance and chrominance sample defining bytes alternate, with the alternating bytes of the two different chrominance components separated by two luminance component bytes. Since the two streams provided by each I/O interface are byte serialized, each of the input video busses 28-34 and input boundary key busses 36-42 are composed of eight lines. Lines carrying luminance and chrominance data have a byte period of 50 ns. The lines carrying key data have a byte period of 150 ns. Accordingly, by way of example only, two bytes of luminance, one of chrominance, and one of key data samples are received via each of the I/O interfaces 20-26 during 150 ns periods.

Accordingly, bytes of processed key data, such as received via busses 44-50, have a period of 150 ns. The video signal input received on busses 28-34 have a period of 50 ns. Consequently, two bytes of luminance are received for one byte of processed key data. Each byte of processed key data is used to cut one byte of luminance. One half of each byte of key data is also combined with one half of the following key byte to cut another byte of luminance. Chrominance bytes are functionally grouped in pairs, with each pair defining R-Y and B-Y for the same 300 ns period. Since the chrominance pair represent the same time period, they are cut with the same processed key. A percentage of each byte, in a group of four key bytes, is summed to produce a combined key for each functional pair of chrominance bytes. The two latest bytes in each group of four key bytes become the two earliest bytes in the next group of four key bytes.

As previously mentioned, video channel combines are produced by processing the binary numbers representing image values to be displayed on a sample-by-sample basis. The channels to be combined first are synchronized so that binary numbers in different channels arrive at the processing logic in the combiner system during the same cycle of processing clocks. Delays in cables and equipment which cause the accumulation of small timing differences makes channel synchronization necessary, even though all video channels initially are generated in synchronism with a master reference. Synchronization is accomplished by selecting one video channel as a reference, and then synchronizing the other video channels in the same combine to the timing signals used in the reference video channel. The line reference signals shown coupled to the I/O interfaces 20-26 in FIG. 1A provide the timing signals by which the video channels are synchronized.

The keyer means 200,300 of FIG. 1A are in practice interconnected to form an integral keyer unit. As depicted, keyer means 200,300 receives the boundary key of each channel A-N, but does not receive any input video from the channels. The keyer means produces the processed key which reflects the priority of each channel in a combine. The keyer means also provides one or more background video, one or more processed background keys and one or more processed composite keys as required for one or more combines respectively.

Background video do not have line or vertical sync pulses and are generated as by a programmable color matte generator to provide a flat field of gray, black, or other color. Accordingly, background video may be supplied by any suitable external source. After being cut by the background keys and added to associated combine data, the background video provide the desired background for the composite video signal, that is, the composite video image. Composite keys provided by the keyer means are fed to the I/O interfaces 64-70 of FIG. 1B, and are utilized by downstream switcher apparatus to key in a desired different background as may be desired.

When keys are processed for a combine, the data representing a key for a given channel are modified by data from any channel with higher priority. For example, in a combine with channel D having the highest priority, followed by channel B and then channel C, channel D key data are uneffected. Channel B key data are modified only by key data from channel D, and channel C key data are modified by key data from both channels D and B.

Referring to FIG. 1B, the cutter means 400, 402, 404 cuts away video that is not to appear in a combine. To this end, the cutter means receive the plurality of video and processed key inputs, and cuts the video in response to the respective processed keys by multiplying the processed key against the respective video, to produce cut video signals on each channel A-N. The cutter means is interfaced with the combiner computer means 98 via the lines 100, as further described below.

Thus, the amount that a binary number, and hence the video information image is cut, depends mostly on the key for the channel at the corresponding temporal and spatial location of the displayed composite video image. To illustrate, each point 1 through 5 in FIG. 3 represents such a location, where point 1 is on the background. The numbers of all three channels A,B,D are cut to 0% at this point since the key will be the minimum value of 10000000. At point 2, 100% of the channel A number is added to 0% of the channel B and D numbers. At point 3, the channel B number is cut slightly and the channel A and D numbers are cut to 0%. If a key of 01011111 is assumed for channel B, its number is cut to 87.5% at point 3.

The position of the channel, that is, the priority, in the front-to-back sequence of channels in a combine, also affects how a number is cut. Channel B has the highest priority, channel A is next, and channel D has the lowest priority. Thus channel D at point 4 is cut to 0% since it has a lower priority than channel A, which is completely opaque with a key of 01111111 at this point. The channel A number at point 5 is cut to 12.5% since it has a lower priority than channel B, which has the key of 01011111 at point 5, representing a cut to 87.5%.

Cutting is accomplished by first processing key data according to priority and then multiplying bytes of processed key data by bytes of corresponding luminance and chrominance component data. In the present implementation as described herein, binary numbers representing key are first converted to binary fractions to make them compatible with integrated circuits that perform the arithmetic functions. Thus, in the binary fraction notation, the maximum value of a number is one, written as 1.0000000, and the minimum value is zero, written as 0.0000000.

The cut video signals are supplied to the adder means 500 which, in the embodiment of FIG. 2B, perform two combine operations simultaneously. Any combination of video inputs can be fed to either adding process, and the outputs of either adding process can be fed to any of the channel composite video busses 84-90. Gating the video signals into and out of the adder means 500, and the gating of the I/O interfaces to direct video to the signal system, is controlled by the control data on lines 100 extending from the combiner computer means 98.

In FIGS. 2A,2B, the combiner of FIG. 1A,1B is implemented as a four channel system including four channels A, B, C, D, of boundary keys, and four channels A, B, C, D, of input video, and adapted to perform two independent combines simultaneously. In both FIGS. 1 and 2 like components are similarly numbered. Obviously, additional channels and additional combine processes are contemplated within the invention combination.

For simplicity of description, since the components in the channels A-D of keyer means 200, 300 (hereinafter termed keyer means 202) are identical, primarily the channel A circuit is discussed in detail. Thus, keyer unit 204 is described in detail, while keyer units 206, 208, 210 of channels B, C, D, respectively, are shown in block form.

Referring to channel A of FIG. 2A, the boundary key A on buss 36 comprises the values of the binary numbers which define the display of a video image on a given background. In the environment of FIGS. 1A,1B, the boundary key A, which may be supplied by the ADO system of previous mention (not shown), is a boundary key of selected sample rate with a given format acceptable to the present combiner system. As previously mentioned, the boundary key A may be generated by other sources which provide similar signals. The boundary key is a succession of binary numbers of 8 bits, each of which equal 1.0 where the video image is present and is 0.0 where the image is not present, i.e., where there is background. In the transition between the image, or images, and background, the values of the key range over corresponding values between 0.0 and 1.0.

The boundary key A is supplied to a transparency multiplier 212, which controls the transparency of the channel by modifying the key data directly in response to a computer control signal on a control line 214. The control signal is in the form of a transparency factor, or coefficient, supplied by the lines 100 of the computer means 98 (FIG. 1B) which directs the multiplier 212 to multiply boundary key data by the coefficient to provide a key which is reduced by the amount of the coefficient. For example, if the coefficient equals 1, there is no effect on the boundary key A. If the coefficient is some value less than 1, the multiplier 212 reduces the value of the key accordingly. The coefficient key reduction for transparency effects may be changed on a field-by-field basis.

The boundary key A, after transparency, is introduced to a programmable time delay 216, which corrects the timing of the key for subsequent introduction to the key processing logic, vis, into a priority processor 218. The extent of the delay is programmed by the computer means 98 via lines 100 corresponding to a control input 220 of the variable delay 216. Although boundary keys for all channels are synchronized prior to entering the keyer units, they must be retimed so that, depending upon the priority order of the channels, corresponding key data in different channels are processed by respective keyer units in the same cycle of processing clocks. The priority order is controlled by the computer means 98 and accordingly the delay control signal will reflect the priority of the channels. A highest priority channel will receive the shortest delay whereas the lowest priority channel will receive the longest delay. It follows, the time delay of the highest priority channel is zero, with increasing time delays programmed for the delays in the channels of decreasing priority order. As described further below, the overall time delays of all channels also must be identical. Accordingly, as the computer means 98 changes the priorities of the channels on a field-to-field basis, it also alters all the channel delays to reflect the change in the priorities.

The boundary key A from delay 216 thus is essentially the same signal as the boundary key A on buss 36 except for any reduction which may have been made in channel transparency. The key A from the delay 216 is introduced on a buss 224 as a "key-requested" input, to the priority processor 218 and particularly to a minimum circuit 222 thereof. The priority processor 218 also receives an input on a buss 226 from a dual selector 228. The selector has first and second halves and each selects one of (N+1) inputs for output therefrom in response to a common control 229 for both halves, which extends to the lines 100 of the computer means 98. The key on 226 is labeled "key-taken-prior" and is the resource, or key value, which has been taken by any higher priority channel. The key-taken-prior is fed to an inverter 230 which performs a binary inversion and generates a key on a buss 232 herein labeled "key-available". The minimum circuit 222 provides an output which is the minimum value of the key-available and the key-requested inputs on busses 232, 224, respectively. The output on a buss 234 is labeled "key-taken", and is, in essence, the processed key for channel A.

The minimum circuit 222 is employed for two reasons: First, under the condition for a particular image, where the key has not been reduced and channel A would like to take a selected amount of the key resource. The resource can be taken since none was taken previously. That is, channel A can have all the resource it wants as long as the key available is equal to or greater than the value wanted. Second, the channel wants a given amount of the key resource, but the key available is zero. In this case the channel can have only so much of the resource as is available; viz, none. The minimum circuit 222 performs a straightforward minimum value select, and includes a comparator, which compares the inputs to determine which is less, and a selector which then selects the smaller of the inputs.

Thus the key-taken output on buss 234 is the channel A key, which is then fed to a dimness multiplier 236, similar in function to the transparency multiplier 212 of previous discussion, except that the channel is dimmed, that is, a percentage of background video will be forced into the channel A video without affecting any lower priority channels. The dimness multiplier 236 is in the combiner system because, once the key-taken output on buss 234 is generated for the channel, there is no possibility of reducing the key value, since any reduction would reflect erroneously on lower priority channels which receive this output. However, there are instances in which it is desirable to reduce the value, i.e., dim the processed key of a channel. Accordingly, the dimness multiplier 236 allows the present combiner to alter the key-taken output to a smaller value, in response to a dimness factor or coefficient supplied at a control input 238 thereof, from the lines 100 of the computer means 98 of FIG. 1B. As with the transparency multiplier 212, if a coefficient of 1 is provided by the computer means 98 on control line 238, there is no reduction in the key-taken output. The full value is passed to a buss 240 as the processed key for the channel A, after dimming. If a smaller coefficient is supplied by the computer, then a proportionate amount of reduction in the key-taken output is provided by the dimness multiplier 236, which is reflected in the value of the key taken after dimming on buss 240.

The processed key taken after dimming on buss 240 is fed to another programmable time delay 242 similar to delay 216 of previous mention. The second delay 242 re-times the processed key according to the delay required for the particular channel in order to supply the processed key at the subsequent cutter means of FIG. 2B to allow it to be multiplied against the respective video in the cutter means. It follows, all processed keys must be timed with each other. Thus the time delay of the delay 242 is the inverse of the amount of time provided by the delay 216. Further, the overall delay of each channel, that is, the amount of time delay between the input to the first delay (216) and the output of the second delay (242) through the key processing paths of each of the channels A-D, must be identical. The time of the second delay is programmed via the control line 244 coupled to the lines 100 of the computer means 98. Thus the processed key A, properly timed by delay 242, is fed to the cutter means on the buss 44.

Returning to the priority processor 218, the key-taken output on buss 234 and the key-taken-prior input on the buss 226, are supplied to an adder 246 which sums the resources and provides a "key-taken-now" output on a buss 248. The key-taken-now is the combination of the resource that was taken by any higher priority channels, and that taken by channel A. The key-taken-now output is coupled to a buss 250 of a pair of busses, which extend through all the keyer units of all the channels A-D, as well as through the background key channels. The buss 250 thus is coupled back to the input of the first section of the dual selector 228 which, in turn, provides the key-taken-prior of previous mention on buss 226. Likewise, the buss 250 also inputs to the first sections of the dual selectors of the other channel keyer units 206, 208 and 210. The buss 250 also is coupled to a first section of a dual selector 252 of a background key-1 channel, and to a first section of a dual selector 254 of a background key-2 channel.

A second buss 256 also extends across the keyer units, and is coupled to the second sections of the dual selectors 252, 254 of the first and second background key channels, as well as to the second sections of the dual selectors of the video channels B-D, respectively. The separate busses 250,256 may comprise a single, multiplexed buss, if desired.

It may be seen, that the key-taken-now output on buss 248 and buss 250, is available for the next lower priority channel to select via the respective dual selector of that channel. For example, if channel B is the next lower priority channel, its dual selector 257 will select the key-taken-now from channel A as its input on a buss 258 and will feed it to its priority processor 259 under a computer command extending to control line 261. Thus the subsequent key-taken-prior output fed to next lower priority channel B, in this example, reflects the value of the key resource taken by the higher priority channel A previously.

The second section of the channel A dual selector 228 is coupled to the buss 256 and operates simultaneously with the first section, to provide a key-taken-prior output on a buss 260, coupled to one input of a dimness adder 262. The other input to the adder 262 is the processed key taken after dimming, on buss 240. Thus the adder 262 provides means for accounting for how much of the key resource was taken by channel A after the dimming process, if any dimming was performed. The adder 262 provides a key-taken-now output, after dimming, which includes the dimming values of all prior channels, and which is coupled to the buss 256. Subsequent lower priority channels are coupled to the buss 256 in a succession determined by the priority, in response to the computer means 98, whereupon the channel with lowest priority provides an output from its dimness adder, which is the sum of all channel dimming processes. Thus the final output provides an indication of how much background video is to be included in the composite video image where no video image is present, or due to the contribution of the dimming process in regions where video images are present.

Accordingly, the two busses 250 and 256 carry key resource data which indicate, respectively, how much key resource has been taken by any higher priority channels, and how much key resource has been taken after dimming processes have been added in as well. The busses 250, 256 also are coupled to respective 8 bit busses 266 and 268, whereby each buss 250, 256 has one more set of 8 lines than there are number of channels in the system. A binary "0" is inserted on busses 250, 256 via the busses 266, 268, since the highest priority channel must select a "0" input for its key-taken-prior output on buss 226, since no amount of the key resource has been taken prior to the highest priority channel. Accordingly, the computer means 98 programs the highest priority channel dual selector to select the "0" off the busses 250, 256. Both the key-taken-prior busses 226, 260 thus are supplied with binary "0", which inputs respectively are fed to the priority processor 218 and the dimness adder 262.

As mentioned, the lowest priority channel determines the final value of the dimness reduction and supplies the number to the buss 256. The computer means 98 then enables the dual selector 252 or 254 of the background key channel corresponding to the associated combine process. The key-taken-now output indicative of the sum of the key resources after all dimming processes, is fed via the second section of the dual selector 252 or 254 to an inverter 270 or 272. The inverter provides an output which is one minus the inputs, i.e., 1 — the total dimness sum. The resulting processed background key from inverter 270 or 272 is fed to a programmable time delay 274 or 278 respectively, wherein the key is suitably delayed to provide proper timing for the subsequent multiplication process in the cutter means. As previously discussed relative to the processed key channel delays, the total time delay through the processed key channels and either of the background key 1 or 2 channels must be identical. The suitably timed processed background keys 1 and 2 are provided on the busses 54, 58, respectively. The processed background keys provide data which determine how much background should be included in the composite image to compensate for dimming performed in the respective channels. Thus, if dimming in a channel is requested back to background level, as when it is desired to reduce luminance and chrominance to zero, the resulting hole in the composite video image of that channel will be filled with background.

Accordingly, where there is no dimming performed in any of the channels, which may be generally the case, the output of the priority processor and of the dimming multiplier will be identical. Accordingly, the background key fills background in all areas of the video picture which are not occupied by the combined video images from the channels.

The first sections of the dual selectors 252, 254 of the background key channels, are used to provide the composite keys 1 and 2 on busses 60, 62, respectively. To this end, the outputs of the channel priority processors are supplied via the respective buss (248) and adder (246) of the lowest priority channel, to the buss 250 as a key-taken-now output, which data is indicative of how much key resource has been taken by all of the channels in a specific combine. The first section of the respective dual selectors 252 or 254 are enabled by the computer means 98 depending upon the combine, to pass the key-taken-now output from buss 250 to a respective programmable time delay of delays 276, 280, and then to busses 60 or 62. It may be seen that the processed composite keys differ from the processed background keys in that the former do not have any contribution due to the dimming process. Thus the composite key is employed downstream of the present combiner as, for example, by a downstream switcher (not shown) in order to key in a different background than that provided by the combiner system.

Background video is depicted herein on FIG. 2A, as supplied by background video generators 282,284 on respective outputs busses 52,56 respectively. The resulting background video 1 and 2 comprise generally conventional programmable color matte, as previously mentioned, wherein the color is selected by the computer means 98 via lines 100 thereof.

Referring to FIG. 2B, the four processed keys A, B, C, D, and the two processed background keys one for each combine being made simultaneously, are supplied to the cutter means 400, 402, 404 (hereinafter termed cutter means 406). As previously mentioned, the processed keys are all timed to be in synchronism with the input video signals A-D on busses 28, 30, 32, 34, respectively. The processed keys associated with each input video signal are multiplied via respective multipliers 408, 410, 412 and 414. The processed background key 1 on buss 54 is multiplied by the background video 1 on buss 52 in a background multiplier 416, while the processed background key 2 is multiplied by the background video 2 in a background multiplier 418. The multipliers include bandwidth matching circuits that process the processed keys, to match the bandwidth of the key signal to the bandwidth of the video signal. The background video, which are multiplied against the corresponding background keys, are simply the flat fields of programmable color matte.

The cut video A-D from the multipliers 408–414, and the cut backgrounds 1 and 2 from multipliers 416, 418, are fed to respective 8-bit busses of a buss 502 which forms part of the adder means 500 of previous mention. Each set of 8 bit lines of video, e.g., busses 504, 506, 508, 510, are in turn coupled to respective buffer switches 516, 518, 520, 522, and thence to a first adder unit 524. The cut background 1 is fed from the buss 512 directly to adder unit 524 via a bus 523. The same cut video busses 504, 506, 508 and 510 also are coupled respectively to buffer switches 526, 528, 530 and 532 of a second adder unit 534, while buss 514 of cut background 2 is coupled directly to adder unit 534 via a buss 533. The adder units 524, 534 supply two composite video output signals simultaneously on output busses 536, 538, for subsequent use by the signal system via the interfaces of FIGS. 1A,1B.

FIG. 4 depicts a further implementation of a cutter section illustrated as plural multipliers 408-418 in FIG. 2B. The processed key of, for example, channel A, delayed by the variable delay 242, FIG. 2A, is fed via buss 44 to a tapped key delay 432. This delay provides simultaneous access to sequences of key bytes as required to generate the combined bytes of the key and video data format of previous mention. Outputs of the tapped delay 432 are fed as respective key byte sequences to luminance and chrominance key processor circuits 434, 436, which produce combined key bytes to cut luminance and chrominance bytes, respectively. The outputs of the key processor circuits are fed, as respective combined luminance and chrominance key bytes, through a key multiplexer 438 to a multiplier 440. The multiplier 440 also receives the luminance and chrominance input video signals herein depicted as input video A on the buss 28. The key multiplexer 438 supplies combined key bytes from the correct sources as required to multiply the luminance and chrominance bytes of the input video on buss 28. The cut video A signal from the multiplier 440 is fed, on the cutter buss 420, to the buss 504 of FIG. 2B for subsequent application to one of the adder units 524,534.

Each cutter section also has a timing generator 442 to provide clock and control signals required by the section components, on lines 444. The inputs to the timing generator 442 comprise a horizontal synchronizing pulse, H, and a high speed synchronous clock, 3×, signal supplied from reference video on the line 94 from the clock means 600 (FIG. 1B) and used for the respective combine being processed by the cutter section.

FIG. 5 depicts an implementation of adder means 500 of FIG. 2B, wherein cut video of channels A-D and cut background 1 and 2 are fed via respective busses 420-430 to adder units 524, 534 via initial input buffer means 431 and adder input buffers, the latter being depicted in FIG. 2B as adder buffer switches 516-522 and 526-532, and by the adder busses 502. Input-enable signals for each channel are fed to respective buffer switches 516-522 and 526-532 (FIG. 2B) from a computer interface means 540 which, in turn, is controlled via inputs thereto from the lines 100 of the computer means 98 of FIG. 1B. Those channels to be added together at any given time are gated into the same adder by active logic states of associated enable signals. Thus, the adder means 500 adds any two combinations of input video channels at the same time, thereby providing two combines simultaneously. The output of each adder unit is fed to an associated output register 544,546 via respective composite video output busses 536,538 whereby the results of either combine can be supplied from the adder means 500 of FIG. 5, on any combination of output channels. A restriction imposed by software in order to protect the output circuits, is that no output channel can supply both combined video signals at the same time. Either output register 544,546 gates its combined video input to any combination of output channels via busses 542, wherein the outputs are fed to downstream I/O interfaces depicted, for example, in FIGS. 1A,1B. Output enable lines from the interface means 540 to each output register, control the output signal gating.

The present combiner includes means for automatically determining the priority of the channels, and thus the spatial order of the video images in a combine, on a continuous field-by-field basis. Thus, for example, as video images in a composite video image change positions, their order of priorities also are changed automatically so that the channel whose image is in front has the highest priority, etc. Accordingly, given a two-channel system and given two plane equations X and Y, and four points on each plane that bound a region on the plane, the region that is in front can be determined by:

(1) placing the four points that bound region Y into plane equation X;
(2) checking to determine if all the results are positive or zero, or negative or zero. If they are positive or zero, region Y is in front of region X. If they are negative or zero, region X is in front of region Y. If they are mixed then the process proceeds to step 3.
(3) placing one of the points that bound region X, into plane equation Y.
(4) checking to determine if the result is positive or negative. If it is positive, region X is in front of region Y. If it is negative, region Y is in front of region X.

This process is repeated to find the relationships of more than two regions as in a four-channel combiner system. The process is used in an automatic priority selection mode of the combiner to continuously determine in real time which channels are in front of the other. The channels are spatially ordered from the highest to the lowest priority. The data generated is used by the computer means 98 to enable respective channel dual selectors (e.g., selectors 228, 257 of channels A,B, respectively) to select the channels in the order determined by the above process on a field-by-field basis. The computer means simultaneously changes the respective time delays of the channels (e.g., delays 216,242 of channel A, in accordance with the priority changes, as previously described. The data corresponding to the plane equations X and Y, and the locations of the four corner points, are supplied by the digital optics signal system of previous mention. It is to be understood that the priority selection also can be manually programmed, and/or a combination system employing both manual and automatic priority programming on respective pairs of channels is contemplated.

The dimness effect of previous description integrally includes a light source feature for highlighting selected video images in the composite video image. The value of dimness is recalculated for each channel for each field. The calculation is performed in software by the use of an algorithm which is designed to produce a particular desired visual effect. Many such algorithms may be used in accordance with this invention.

In the present combiner, the algorithm has been selected so that channels of video appear to be illuminated to a selected level of ambient light. A parallel light source provides parallel light in a selected direction such that illumination from this source differs based on the apparent orientation of the video image. A value of reflectance is also assigned to each channel to determine the percentage of incident light which is reflected. To provide this effect, the dimness value for each channel is determined by the following equation:

$$\text{Dim} = R(AML + SL(\overline{PN \cdot \overline{LSV}}))$$

where: Dim is the dimness value; R is the plane reflectance value; AML is the ambient light level; SL is the parallel source light level; PN is the normal to the plane; and LSV is the light source vector.

The above process is repeated for each channel of a common combine to obtain the corresponding value of dimness for each video image of the combine. The results are used by the computer means 98 (FIG. 1B) to modify the dimness factor fed to the respective control lines of the dimness multipliers (FIG. 2A) of each of the channels on a field-to-field basis, as previously described. The process is readily adapted to allow manually programming the dimness values of each channel by setting SL equal to 0%, AML equal to 100% and letting R be the programmed dimness for each channel.

As seen in the equation, the dimness value has two major components, the ambient light level AML and the parallel source light level SL. The parallel light level is applied to the dimness depending on the relative direction of orientation of the plane, i.e., the video image for a channel, as compared to the designated direction of the light source. This is determined by the dot product PN·LSV which is equal to the magnitude of vector $\overline{PN}$, multiplied by the magnitude of the vector $\overline{LSV}$, multiplied by the cosine of the angle between the vectors. In the implementation, both vectors are treated as unit vectors so that the product is equal to the cosine of the angle between the vectors. Thus, if the orientation of the video image is normal to the light source so that the angle is zero degrees, the cosine is one and the full amount of the parallel source light level is applied to the dimness function. If the plane of the video image is parallel to the light source vector so that the angle between the light source vector and normal vector is 90°, the cosine is zero and the parallel source light level has no effect on dimness for that channel. Thus, if a video image were in an apparent rotation, the dimness resulting from the parallel light source alternately increases and decreases with changes in orientation of the video image.

The ambient light level AML is not dependent on angle. Thus, a selected ambient light level is applied equally to all channels regardless of orientation. Accordingly, for a video image in apparent rotation, the ambient light level does not change.

Thus, as a video image appears to rotate, the light level incident thereon varies with the change in angle between the light source vector and a normal to the plane of the video image. The minimum possible light level is equal to the ambient light level and a maximum possible light level is equal to the sum of the ambient and parallel source light levels.

In determining dimness, an additional characteristic, reflectance, is considered in the equations. Reflectance represents the percentage of incidence light which is reflected by the video image and can be individually selected for each channel. If the reflectance is at 100%, all of the light calculated for the ambient and parallel source light level will be applied to dimness. If the reflectance is zero, no light will be reflected, regardless of the ambient and parallel source light levels.

The resulting value of dimness that is supplied in the form of a coefficient is fed to the dimness multipliers of the channels by the computer means 98, and may range from zero to 100%. Accordingly, if the calculation of the equation results in a dimness value greater than 100%, it is reduced to be equal to 100%.

What is claimed is:

1. System for producing selectively reduced video image signals in respective channels, each channel having an input for receiving input video image signals and an output for providing the reduced video image signals, comprising:
   means for supplying boundary key data representative of a key-requested signal for the video image signal of each channel;
   control means for determining and selectively switching the priority order of the channels;
   means receiving the boundary key data of each channel and responsive to said control means for generating successive processed key signals in the channels as they decrease in priority, and for modifying, with the value of a processed key signal in a higher priority channel, the value of the processed key signal in the next highest priority channel; and
   means for reducing the video image signals in each channel in response to the respective successive processed key signals, to provide said selectively reduced video image signals in respective channels.

2. The system of claim 1 for further producing a combine of desired percentages of the video image signals, including:
   means coupled to the reducing means for summing at least two of the reduced video image signals to provide said combine of desired percentages of video image signals.

3. The system of claim 2 including:
   means for supplying background video to the reducing means;
   said generating means further including means for generating a processed background key signal indicative of a preselected value of said background video; and
   wherein said reducing means and summing means provide the preselected value of background video, in response to the processed background key signal, in all areas of the combine wherein the selectively reduced video image signals do not equal a 100% summation.

4. The system of claim 2 wherein the generating means include:
   transparency means, coupled to the supplying means in respective channels, for additionally reducing the value of the respective boundary key data in response to a selected transparency factor indicative of a desired transparency for the input video image signal of the corresponding channel.

5. The system of claim 2 including:
   sampling means for supplying the input video image signals in the form of digital samples; and
   the supplying means, the generating means, the reducing means and the summing means perform their functions on respective input video image signals and key signals on a sample-by-sample basis.

6. The system of claim 3 wherein the generating means include:
   dimming means, coupled to the generating means in respective channels, for modifying the value of the respective processed key signal to allow increased the processed background key signal, in response to a selected dimness factor indicative of a desired dimming of the input video image signal of the corresponding channel.

7. The system of claim 6 wherein the dimming means includes:

means for programming the selected dimness factor as determined by the application of respective values in the relationship;

$$Dim = (AML + SL \overline{(PN \cdot LSV)})$$

where; R is a plane reflectance value; AML is an ambient light level; SL is the parallel source light level; PN is a normal to the plane; and LSV is a light source vector.

8. The system of claim 2 wherein:
said control means is coupled to the generating means and selectively determines the channel in which the generating means generates one of the processed key signals whose value corresponds to a desired maximum percentage of the respective video image signal, to assign the channel first priority and the corresponding video image signal first priority in the combine.

9. The system of claim 2 wherein:
said control means provides priority control data on a field-to-field basis, which data are indicative of the front-to-back relation of one input video image signal relative to another input video image signal in the combine; and
said generating means re-assigns the priority order to the channels in response to the priority control data from the control means, to thus re-assign accordingly the order in which the successive processed key signals are supplied to and from the channels.

10. Circuit for providing a composite video image from multiple digital video images, comprising:
means for supplying boundary key data indicative of the boundaries of the respective digital video images of each channel;
means or generating from the boundary key data respective processed key data indicative of preselected percentages desired for the digital video images in the composite video image;
control means responsive to the generating means for assigning a preselected front-to-back priority order to the digital video images in the composite video image on a field-by-field basis;
said control means continually re-assigning the front-to-back priority order for each field in the composite video image on the field-by-field basis;
said generating means modifying, with the value of processed key data in a higher priority channel, the value of processed key data in the next highest priority channel;
means for cutting the respective digital video images to the desired preselected percentages in response to the respective processed key data; and
means for summing the cut digital video images to provide the composite video image.

11. The circuit of claim 10 wherein the generating means include:
means responsive to the control means for additionally reducing the value of the respective boundary key data in a channel in accordance with a transparency factor corresponding to a selected degree of transparenecy desired for the respective digital video image in the channel.

12. The circuit of claim 10 including:
means for providing at least one selected background video signal to the cutting means;
said generating means further generating processed background key data indicative of a preselected percentage of background video; and
wherein the proportions of the composite video image that do not total 100% are filled with background video in response to the processed background key data.

13. The circuit of claim 12 wherein the generating means include:
means, coupled to receive the processed key data in a respective channel and responsive to the control means, for modifying the processed key data associated with a respective digital video image, to modify accordingly the processed background key data, in accordance with a dimming factor corresponding to a selected degree of dimming.

14. The circuit of claim 10 wherein the mutliple digital video images includes at least four digital video iamges, wherein:
the generating measn generates the respective processed key data of preselected percentage for each of the digital video images while modifying the successive processed key signals in cascade fashion in accordance with decreasing channel priority; and
the summing means provide two independent composite video images from any combination of two of the four digital video images.

15. A circuit for producing a display of a composite video image from desired percentages of multiple video images, comprising:
means for supplying binary numbers representing values of the multiple video images at respective temporal and spatial locations of the display;
means for providing binary numbers representing boundary key data of the multiple video images at the respective temporal and spatial locations of the display;
means for determining a higher to lower priority order for the multiple video images;
means responsive to the determining means for generating processed key data from the boundary key data, wherein the processed key data correspond to respective preselected values of binary numbers representative of said desired percentages of the multiple video images at the temporal and spatial locations of the display;
wherein the value of processed key data of a higher priority video image of the multiple video images modifies the value of processed key data of a video image of lower priority;
means for multiplying the binary numbers of the multiply video images by the respective processed key data to produce reduced values of the respective video image binary numbers at the same said temporal and spatial locations of the display; and
means for summing the reduced values of the binary numbers of the multiple video images at corresponding temporal and spatial locations to provide said desired percentages in the composite video image at the temporal and spatial locations of the display.

16. The circuit of claim 15 including:
means for providing background binary numbers representing background video;
means for generating, at the temporal and spatial locations of the display, selected processed background key data;

means for multiplying the background video binary numbers by the processed background key data at the temporal and spatial locations of the display; and wherein said summing means adds in the multiplied background video binary numbers at the temporal and spatial locations of the display where the combined reduced mutliple video image binary numbers do not add up to a binary one.

17. A circuit for producing a combine of digital video signals in respective channels, comprising:

means for supplying digital boundary key signals for each channel of digital video signals;

control means for determining a priority order of the channels;

means for supplying a digital background video signal;

keyer means receiving the digital boundary key siganls from said each channel for generating digital processed video key signals indicative of preselected percentages for the digital video signals of each channel commensurate with the priority order determined by said control means, and for modifying, with the value of a processed video key signal in a higher priority channel, the value of the processed video key signal in the next highest priority channel;

said keyer means including means for generating a digital processed background key signal indicative of a preselected percentage of said digital background video signal to be combined with the digital video signals of said each channels;

cutter means for mutiplying the digital processed video key signals against respective one of said digital video signals, and for multiplying the digital processed background key signal against a respective digital background video signal; and adder means coupled to the cutter means for summing selected channels of multipled digital video signals and to further include the multiplied digital background video signal where the multiplied digital video signals do not provide 100% of said combine.

18. The circuit of claim 17 wherein the keyer means include:

key processing means having an input and output and disposed in each of said respective channels, wherein the output of the key processing means of said higher priority channel provides the input to the key processing means of said next highest priority channel.

19. The circuit of claim 18 wherein the key processing means include:

priority processor means, receiving one of the digital boundary key signals and a key-taken-prior signal, for providing a key-taken signal which is equal to the smaller of the boundary key signal or the key-taken-prior signal.

20. The circuit of claim 18 including:

signal delay means disposed at the input and output of the key processing measn in said each channel for selectively timing the digital boundary key siganl and the digital processed key signals respectively, in responsive to the priority order determined by the control means.

21. The circuit of claim 18 further including:

a first and second bus coupled to the key processing means of all the channels as well as to the means for generating a digital processed background key signal; and a selector switch integral with the key processing means of the channels to provide selectively assigning the priority order to successive channels via the respective bus in response to the control means.

22. The circuit of claim 21 further including:

a minimum circuit integral with the key processing means for providing a key-taken signal;

a first adder coupled from the outputs of the minimum circuit and selector switch to the first bus;

a dimming multiplier coupled to receive the key-taken signal; and a second adder coupled from the outputs of the dimming multiplier and selector switch to the second bus.

23. The circuit of claim 17 further including:

a transparency multiplier disposed to receive a respective one of the digital boundary key signals in a respective channel, for selectively reducing the latter signal in response to a preselected transparency factor determined by the control means.

24. The circuit of claim 18 further including:

a dimming multiplier disposed at the output of the key processing means in each channel for selectively modifying the respective digital processed key signal and thus the digital processed background key signal in response to a preselected dimming factor determined by the control means.

25. A circuit for producing a selected combine of digital video signals taken from respective video channels, including:

means in each channel for supplying selected boundary key data corresponding to a key-requested signal representative of the key desired for the respective channel;

means for determining a priority order of the channels and thus of a front-to-back order of the digital video signals in the selected combine;

first means disposed in a first channel to receive a respective key-requested signal from said supplying means, for generating a first key-taken signal indicative of a percentage desired for the digital video signal in the first channel;

means, coupled to the first means, for providing a key-available signal which is equal to 1 minus the first key-taken signal;

second-means disposed in a second channel to receive a respective key-requested signal from said supplying means and, in response to the key-available signal from the providing means, for generating a second key-taken signal indicative of a percentage desired for the digital video signal in the second channel;

means coupled to the first and second generating means, for reducing the respective digital video signal in each channel in response to the respective key-taken signals; and means for combining the reduced digital video signals in said front-to-back order to provide said selected combine.

26. The circuit of claim 25 wherein:

said first means generates a value for the first key-taken signal corresponding to the maximum available percentage of the digital video signal in the selected combine.

27. The circuit of claim 26 wherein:

said determinng means selectively switches the priority order of the channels to re-assign to the second channel and the second key-taken signal said maximum available percentage of the digital video signal in the selected combine.

28. The circit of claim 25 including:

transparency means, disposed in a respective channel to recieve its respective key-requested signal, or additionally reducing the value of the respective selected boundary key data in response to a selected transparency factor indicative of a transparency desired for the digital video signal of the corresponding channel.

29. A circuit for producing a composite video image formed of preselected percentages of a plurality of video signals in a respective plurality of channels, comprising:

means in each channel for supplying selected boundary key data corresponding to a key-requested signal with a binary value of 1;

control means for continuously determining the priority of each channel of the plurality of channels.

first keyer means disposed in a first channel, for generating a first processed key signal of a desired maximum percentage of the key-requested signal in response to being given first priority by said determining control means;

means for providing an inverted version of the first processed key signals;

second keyer means disposed in a second channel, to further recive the inverted version of the first processed key signal form the first keyer means, for generating a second processed key signal from a second percentage of the key-requested signal which is available, in response to being given the second priority by said determining means;

means for combining the video signals in said desired maximum and second percentages determined by the first and second processed key signals, to provide said composite video image; and said control means selectively switching the priorities of the first and second channels to second and first priorities, respectively, to provide the second processed key signal with said desired maximum percentage of the key-requested signal, and to provide the first processed key signal from the second percentage of the key-requested signal which is available from the second keyer means.

30. A circuit for producing mulitple reduced digital video signals from mutliple digital video signals in respective multiple video channels, and at least one digital background video signal in a respective background channel, including:

means in each video channel, for supplying a digital boundary key signal representative of a key-requested signal for the respective video channel;

control means for determining the relative priority order of the video channels, beginning with a first priority channel;

means for providing a key-taken-prior signal corresponding to a maximum available percentage of a key signal;

keyer means coupled to the providing means and receving each key-requested signal, for generating digital processed video key signals in each channel which are representative of desired percentages for the multiple reduced digital video signals;

said keyer means including key processing means disposed in each of said respective channels and having a further input and an output, wherein the further input of the key processing means of the first priority channel receives said key-taken-prior signal, and wherein the output of the key processing means of a higher priority channel is supplied as said further input to the key processing means of a next highest priority channel; and means coupled to the keyer means for reducing the multiple digital video signals to the desired percentages determined by the respective digital processed video key signals, to provide the multiple reduced digital video signals in the respective video channels.

31. The circuit of claim 30 wherein:

the key processing means includes minimum circuit means in said each channel, for supplying a key-taken signal which is the smaller signal of an inverted key-taken-prior and the key-requested signals; and the key-taken signal of the higher priority channel is supplied as the key-taken-prior signal to the next highest priority channel.

32. The circuit of claim 30 wherein the key processing means includes:

means for supplying a key-available signal corresponding to the difference between the key-taken-prior signal and a binary value of one; and minimum circuit means receiving the key-available signal and a respective one of the digital boundary key signals, for supplying a key-taken signal corresponding to the smaller of the two signals.

33. The system of claim 30 wherein the key processing means includes in each channel:

a first bus associated with the channels;

switch means coupled to the first bus;

a minimum circuit having one input coupled to said supplying means and including said further input, and providing a key-taken signal at an output of the minimum circuit;

an inverter for receiving the key-taken-prior signal and for supplying a key-available signal to said further input of the minimum circuit; and an adder coupled from the minimum circuit output and said switch means back to the first bus.

34. The system of claim 30 further including:

means for providing a transparency coefficient value;

transparency multiplier means disposed in a video channel, to receive one of the digital boundary key signals and the transparencey coeffcient value, for providing a reduced digital boundary key signal in response to the transparency coefficient value.

35. The system of claim 31 further including:

means for supplying said at least one digital background video signal via said background channel;

means for generating a processed background key signal indicative of a preselected precentage of said digital background video signal;

a second bus associated with the multiple video channels and the respective background channel;

means for providing a dimming coefficient value;

dimming multiplier means disposed in a respective one of the video channels for receiving one of the key-taken signals and the dimming coefficient value, and for providing a reduced digital processed video key signal in response to said dimming coefficient value; and adder means coupled from the dimming multiplier means and said switch means back to the second bus.

36. The system of claim 30 including:

signal delay means disposed at the further input and said output of the key processing means in said each channel for selectively timing the digital boudary key signals and the digital processed key signals, respectively, in response to the relative priority order determined by the control means.

37. A method for producing preselected percentage of video image signals in respective video channels as when producing a composite video image from the video image signals, comprising:

supplying digital boundary key data indicative of the boundaries of the respective video image signals of said respective channels;

determining the priority order of the channels and thus of the video image signals;

selecting preselected percentages desired for the respective video image signals in the respective channels and thus in the composite video iamge;

providing a first digital key signal of maximum available value to a highest priority channel;

generating a first digital processed video key signal from the first digital key signal in the highest priority channel in response to the respective digital boundary key data received in said highest priority channel;

providing said first digital processed video key signal from the highest priority channel to a next highest priority channel;

generating a second digital processed video key signal in said next highest priority channel in response to the respective digital boundary key data received in said next highest priority channel; and multiplying the video image signals by the respective digital processed video key signals to provide the preselected percentages of the respective video image signals in the respective channels.

38. The method of claim 37 further including:

adding the multiplied video image signals of preselected percentages together to provide the composite video image.

39. The method of claim 38 including:

providing at least one background video signal;

generating a digital background key signal indicative of a preselected percentage of said background video signal; and multiplying the background video signal by the digital background key signal to provide the preselected percentage of said background video signal required to fill in the composite video image where the summed video image signals do not equal 100% of the composite video image.

40. The method of claim 34 further including:

modifying the digital processed key signal in a selected channel by selectively reducing the digital value thereof while correspondingly increasing the preselected percentage of background video signal in the selected channel.

41. The method of claim 37 further including:

modifying the digital boundary key data in a selected channel in accordance with a desired transparency in the respective video image signal, by selectively reducing the digital value of the boundary key data to also further reduce the preselected percentage of the respective video image signal in the selected channel.

42. The method of claim 41 including:

supplying a transparency coefficient value corresponding to said desired transparency; and multiplying the digital boundary key data by the transparency coefficient value to reduce accordingly the digital value of the boundary key data.

* * * * *